E. M. SOUVIELLE.
TRANSMISSION GEAR.
APPLICATION FILED SEPT. 8, 1914.
1,176,933.
Patented Mar. 28, 1916.
2 SHEETS—SHEET 1.
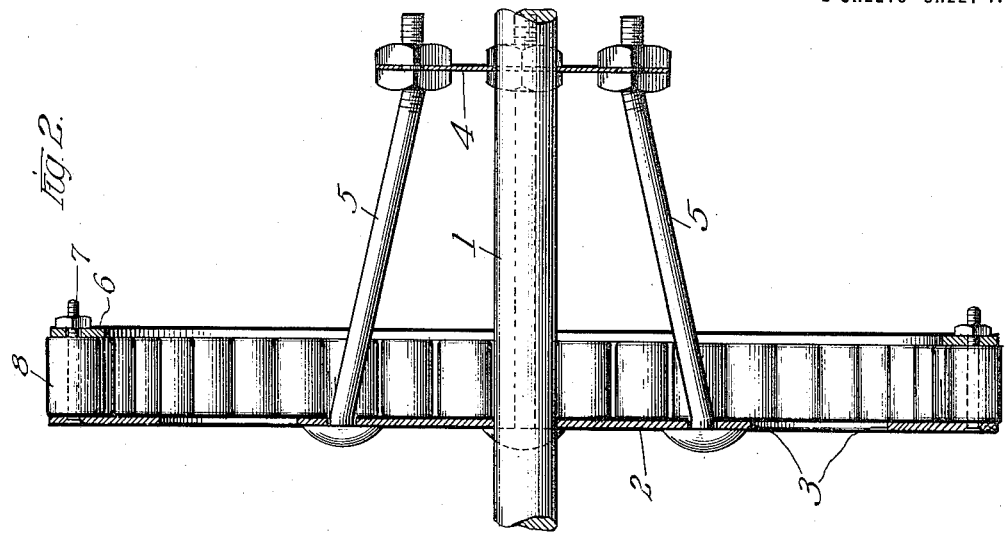
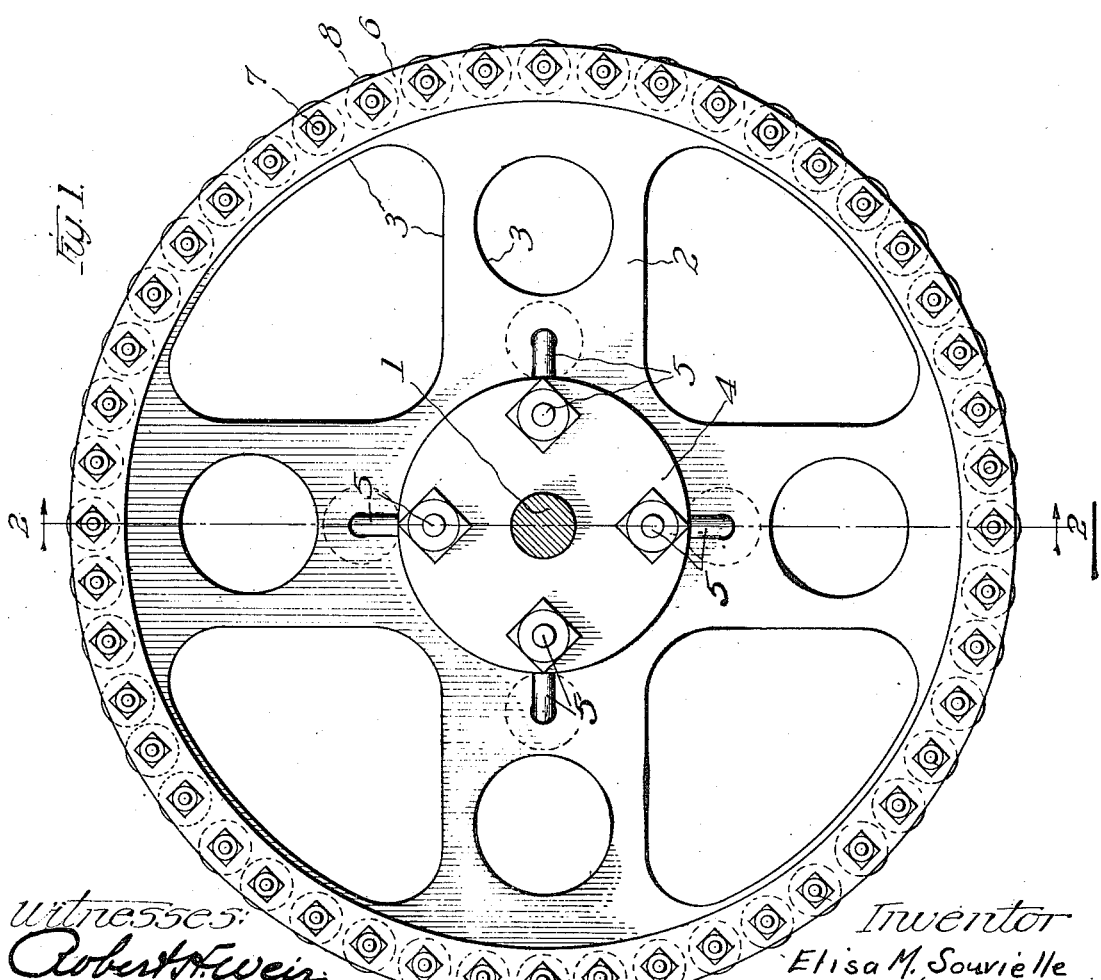
Witnesses:
Robert H. Weir
Charles J. Cobb
Inventor
Elisa M. Souvielle
By Hill & Hill
Attys.

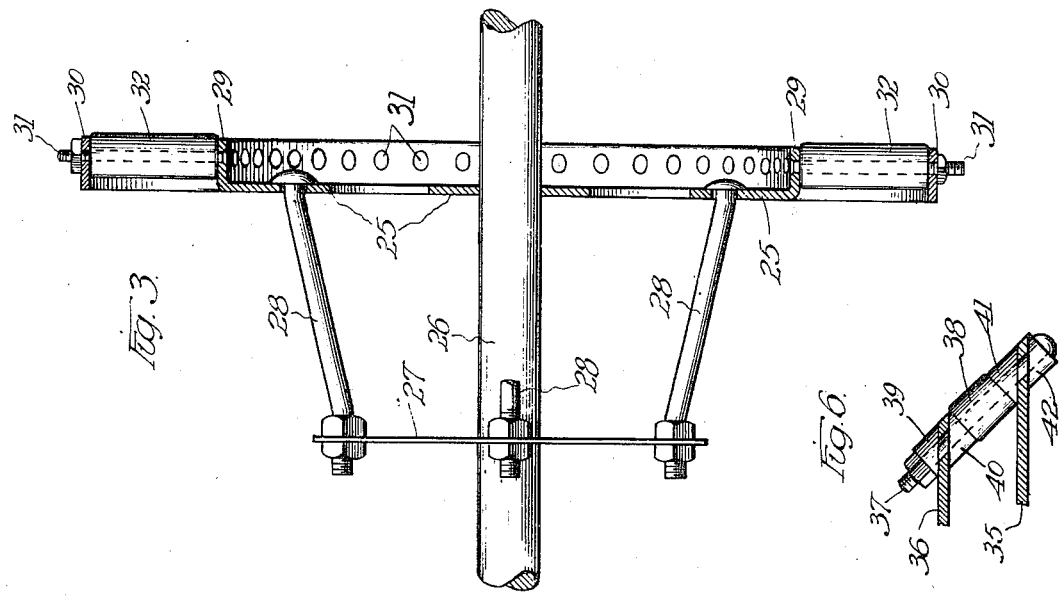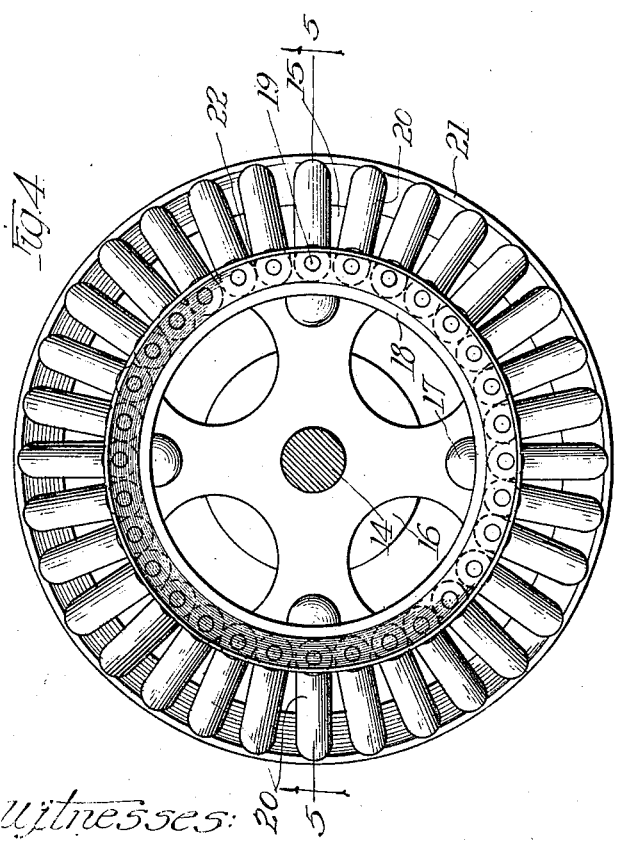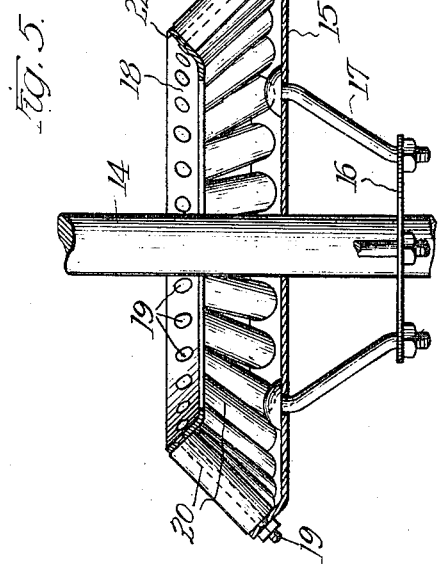

UNITED STATES PATENT OFFICE.

ELISA M. SOUVIELLE, OF JACKSONVILLE, FLORIDA, ASSIGNOR OF ONE-HALF TO GEORGE W. TROUT, OF CHICAGO, ILLINOIS.

TRANSMISSION-GEAR.

1,176,933.  Specification of Letters Patent.  Patented Mar. 28, 1916.

Application filed September 8, 1914. Serial No. 860,669.

*To all whom it may concern:*

Be it known that I, ELISA M. SOUVIELLE, a citizen of the United States, residing at Jacksonville, in the county of Duval and State of Florida, have invented certain new and useful Improvements in Transmission-Gears, of which the following is a description.

My invention belongs to that general class of devices employed for the transmission of power by means of gears, sprocket wheels, belts, ropes, chains, or the like, and relates particularly to an element arranged to be used in connection with any of the means referred to.

The invention has among its objects the production of a light weight transmission member that is of great strength, and one in which the parts may be quickly and economically renewed in case of breakage without removing or discarding the entire structure.

It also has among its objects the production of a device of the kind described that is simple, convenient, durable, efficient, and satisfactory, that may be manufactured at comparatively low cost and used wherever found applicable.

To this end my invention consists in the novel construction, arrangement and combination of parts herein shown and described, and more particularly pointed out in the claims.

In the drawings, wherein like reference characters indicate like or corresponding parts, Figure 1 is a plan view of one form of my device; Fig. 2 is substantially a sectional view taken on line 2, 2 of Fig. 1; Fig. 3 is a sectional view of a slightly modified form; Fig. 4 is a plan view of another slightly modified form; Fig. 5 is substantially a sectional view of the same taken on line 5, 5 of Fig. 4, and Fig. 6 is a detailed view of a modified construction.

Referring to the form of device shown in Figs. 1 and 2, 1 represents a suitable shaft, which may be the driving or driven shaft, as the case may be. Arranged on this shaft is a plate or plates, or disk 2, which may be cut away as at 3, 3, etc., to reduce the weight. As shown, the plate 2 is of comparatively light weight, and is reinforced or stiffened by bolts 5 secured thereto and to a plate 4 arranged on the shaft. The bolts 5 may be bent as shown, or the plates may be formed so that straight bolts may be employed, or washers of suitable shape arranged at the ends of the bolts where they are straight to afford bearings for the heads and nuts of the bolts. Carried by the plate 2 are a plurality of detachable members 7 arranged for coöperation with a sprocket wheel, gear wheel, belt, rope, chain, or the like, these either being driven by my device or arranged to drive it. I also preferably employ an auxiliary member in the form of a ring or plate 6, which is arranged on the ends of the members 7 and braces them. This may be secured in place in any desired manner, nuts being shown for the purpose.

Sleeves or tubes 8 are preferably placed on the bolts, the same serving to space the ring 6 from the plate 2, as well as to reduce the friction between the device and the coöperating driving or driven parts. Any desired number of bolts may be employed, and they may be arranged as desired. In the form shown in Figs. 1 and 2, they are so arranged that the tubes or members 8 extend slightly beyond the periphery of the plate or disk 2 and ring 6.

In the construction shown in Fig. 4, and the sectional half of Fig. 5, 15 is a plate or disk arranged on a shaft 14, the same being suitably connected and braced by a plate 16 and bolts 17, or their equivalents for the purpose. Arranged on one side of the disk 15, as shown, on the side opposite the plate 16, is a plate 18, this being in the form of a ring of less diameter than the plate 15. Plate 15 and ring 18 may be flanged as at 21 and 22, the two parts being connected by members 19, in the construction shown bolts being employed, upon which may be arranged tubes or sleeves 20. This construction is very similar to the one shown in Figs. 1 and 2, except that the pins or detachable elements are at an angle to the shaft 14, similar to a bevel gear.

Another form is shown in Fig. 3, in which 25 is a plate arranged on shaft 26, the same being braced and stiffened by the plate 27 and bolts 28, or their equivalents for the purpose. As shown, plate or disk 25 is flanged about its periphery, as at 29, and bolts or the equivalent 31 extended therefrom, either internally or externally, as shown externally. A ring 30 or its equivalent is arranged about the larger ends of the bolts 31, and tubes or sleeves 32 arranged on the bolts. These operate as in the other construction, and likewise serve to space and maintain the ring 30 in position. It is, of course, obvious that the flange 29 may be turned as shown or toward the opposite side of the device, with this construction, and the same is also true of the other construction. The same may then drive or be driven from either side, or from both sides, or at a plurality of points, from either or both sides, as will be obvious from the preceding description.

Great variation is possible in the construction of the device, the broad feature being that the device may be employed for the transmission of power in coöperation with a belt, rope, chain, sprocket wheel, or the like coöperating or acting with a series of movable elements or units, which device can be quickly and easily repaired or reconstructed without removing or discarding the entire device. In the preferred embodiment of the device two or more plates or disks of metal of equal or different size according to the required service, are employed, which are connected at any desired angles by bolts, or the equivalent, and spaced by sleeve members. The device differs from all others in that it does away with what has been previously considered essential weight. As it is not a circle, but rather a polygon when coöperating with belts, chains, or other means of transmission, all slip is prevented, as the slight angle of the members grasps and pushes the rope, chain, or the like, or is pushed thereby. In other words, it does not depend entirely upon friction; consequently running expense is decreased or efficiency increased. The plate at the side of the device to which the bolts are attached balances the periphery and stabilizes the whole wheel, the same affording leverage for minimum weight. Inasmuch as it can be placed upon either side, either side of the plate may be clear for the application of power. Where a greater number is required, or the wheels are the same size, a plurality of plates may be used where one is shown in the drawings. There being no dead weight there is no danger of explosion, and the device will develop greater power at the periphery and transmit more with the same propelling power required on a heavier device, the teeth, if the tubes or rollers may be so termed, being capable of rotation, to a large extent tend to decrease friction, particularly where the device is used with a toothed driving or driven member.

In Fig. 6, the plates 35 and 36 carry bearing members 39, 40, 41 and 42, beveled to afford bearing faces for the sleeve 38 and bolt ends, 37 being the bolt. These members may be formed on the plates or separable therefrom.

Having thus described my invention, it is obvious that various immaterial modifications may be made in the same within the scope of the appended claims without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a device of the kind described and in combination, a sheet metal disk and a plurality of engaging members spaced about the periphery thereof and detachably secured thereto and a stiffening plate for said disk arranged in the plane parallel therewith, said plate of a diameter less than said disk, and means for connecting said plate and disk independently of the engaging members.

2. In a device of the kind described and in combination, a sheet metal disk, a plurality of engaging members spaced about the periphery thereof and detachably secured thereto, at a constant fixed distance from the center, and a ring member detachably secured at the ends of said members and carried entirely thereby.

3. In a device of the kind described and in combination, a sheet metal disk, a plurality of engaging members spaced about the periphery thereof and detachably secured thereto, and means for stiffening the said disk, comprising a plate arranged parallel therewith, and connecting means between said plate and disk, said means independent of said engaging members.

4. In a device of the kind described and in combination, a sheet metal disk, a plurality of engaging members arranged about the periphery thereof and detachably secured thereto at a fixed distance from the center, a ring of suitable material connecting the ends of said engaging members and supported thereby independent of the disk support and means rotatably arranged on said members for spacing said disk and ring.

5. In a device of the kind described and in combination, a sheet metal disk, a plurality of bolts arranged about the periphery thereof and detachably secured thereto, a ring of suitable material supported by and connecting the ends of said bolts carried by said disk, cylindrical tubes arranged on said bolts for spacing said disk and ring, and a plate arranged parallel with said disk and connected therewith independently of said ring and bolts.

6. In a device of the kind described and in combination, a sheet metal disk provided with a shaft opening therethrough and a sheet metal ring, a plurality of bolts arranged about the periphery of said disk and ring, and detachably secured thereto whereby the ring is supported thereby, and a plurality of cylindrical tubes arranged on said bolts between said disk and ring.

7. In a device of the kind described and in combination, a sheet metal disk and a sheet metal annular ring, a plurality of bolts arranged about the periphery of said disk and ring, and detachably secured thereto and arranged to support the ring from said disk, and a plurality of tubes arranged on said bolts between said disk and ring, and means for reinforcing said disk independently of said ring and bolts.

8. In a device of the kind described and in combination, a sheet metal disk provided with a shaft opening therethrough and a sheet metal ring, a plurality of bolts arranged about the periphery of said disk and ring, and detachably secured thereto, a plurality of tubes arranged on said bolts between said disk and ring, and means for reinforcing said disk, comprising a sheet metal plate arranged to be mounted on the shaft and a plurality of bolts detachably connected to said disk and plate.

9. In a device of the kind described and in combination, a sheet metal disk provided with a shaft opening therethrough provided with a plurality of regularly spaced bolts projecting from thereabout proximate the periphery thereof, means for securing the ends of said bolts together, tubes mounted on said bolts, and means for reinforcing said disk, comprising a plurality of bolts extending from the face of the disk, and a plate arranged to be mounted on the shaft and secured to the ends of said bolts.

10. In a device of the kind described, the combination of a suitable member provided with a plurality of detachable engaging members arranged thereabout, said member provided with a shaft opening at the center thereof, a plate arranged to be mounted on the shaft at one side of said member, provided with a shaft opening in line with said shaft opening in said member, and connecting bolts arranged between said plate and member.

In testimony whereof, I have hereunto signed my name in the presence of two subscribing witnesses.

ELISA M. SOUVIELLE.

Witnesses:
  C. BUCKMAN,
  ELIZABETH E. SMITH.